United States Patent [19]

Faust

[11] Patent Number: 4,630,716
[45] Date of Patent: Dec. 23, 1986

[54] STRIP ROLL FORMING ENERGY ABSORBING DEVICE

[75] Inventor: Daniel P. Faust, Rochester, Mich.

[73] Assignee: General Motors Corporation, Detroit, Mich.

[21] Appl. No.: 740,391

[22] Filed: Jun. 3, 1985

[51] Int. Cl.[4] ............................ F16F 7/12; B62D 1/18
[52] U.S. Cl. ..................................... 188/371; 74/492; 280/777
[58] Field of Search ...................... 188/371, 372, 374; 74/492; 280/777; 297/472

[56] References Cited

U.S. PATENT DOCUMENTS

| | | | |
|---|---|---|---|
| 2,578,903 | 12/1951 | Smith | 188/1 |
| 3,337,004 | 8/1967 | Hoffman et al. | 188/371 |
| 3,486,791 | 12/1969 | Stoffel et al. | 188/371 X |
| 3,547,468 | 12/1970 | Giuffrida | 280/150 SB |
| 4,027,905 | 6/1977 | Shimogawa et al. | 188/371 X |
| 4,142,423 | 3/1979 | Ikawa | 74/492 |
| 4,223,763 | 9/1980 | Duclos et al. | 74/492 X |

Primary Examiner—Allan D. Herrmann
Attorney, Agent, or Firm—Charles R. White

[57] ABSTRACT

Energy is absorbed by bending a sheet metal strip around three rollers as the strip is pulled by one end. Two of the rollers turn on fixed shafts and are spaced so that the third roller cannot pass between them. The sheet metal strip is bent around the floating roller and both ends of the strip are passed between the two rollers on fixed shafts. Applying a force to one end of the strip draws the floating roller against the other two rollers with the strip between them. Continued force application draws the strip through the rollers, first bending it in one direction, then the opposite and back again.

4 Claims, 6 Drawing Figures

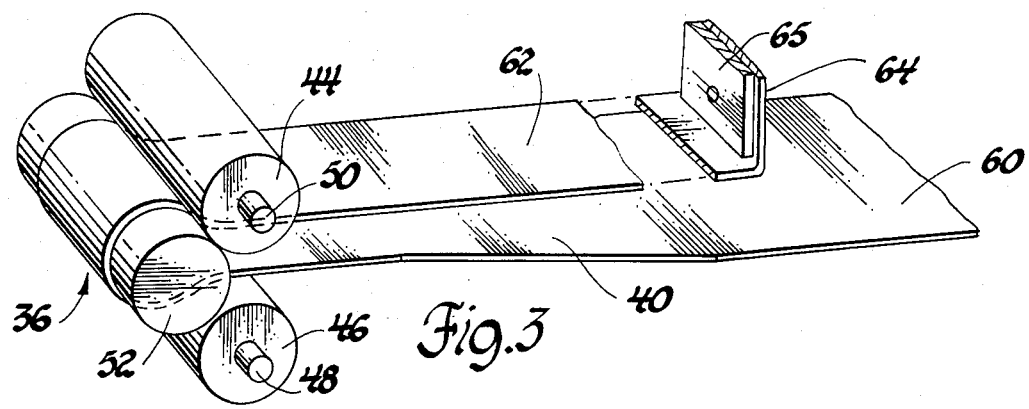
Fig.3
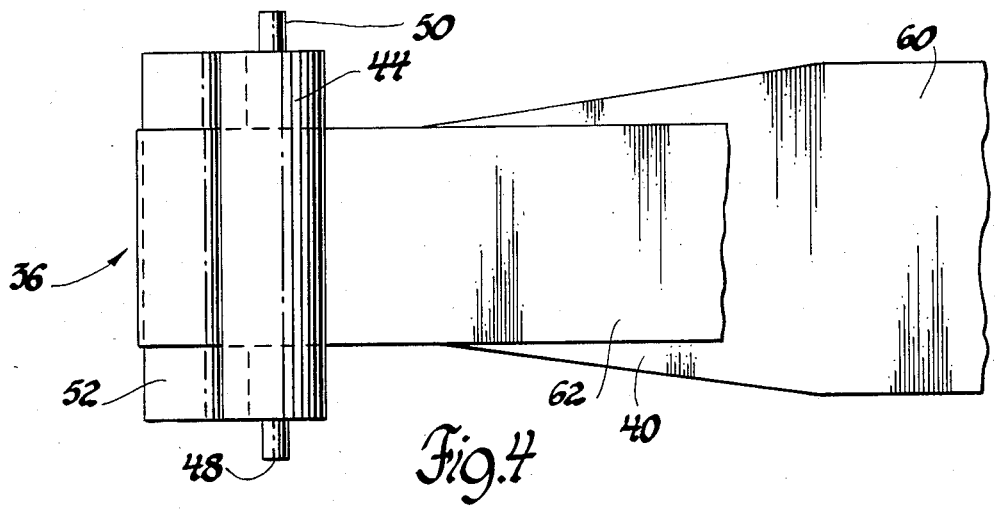
Fig.4
Fig.4A
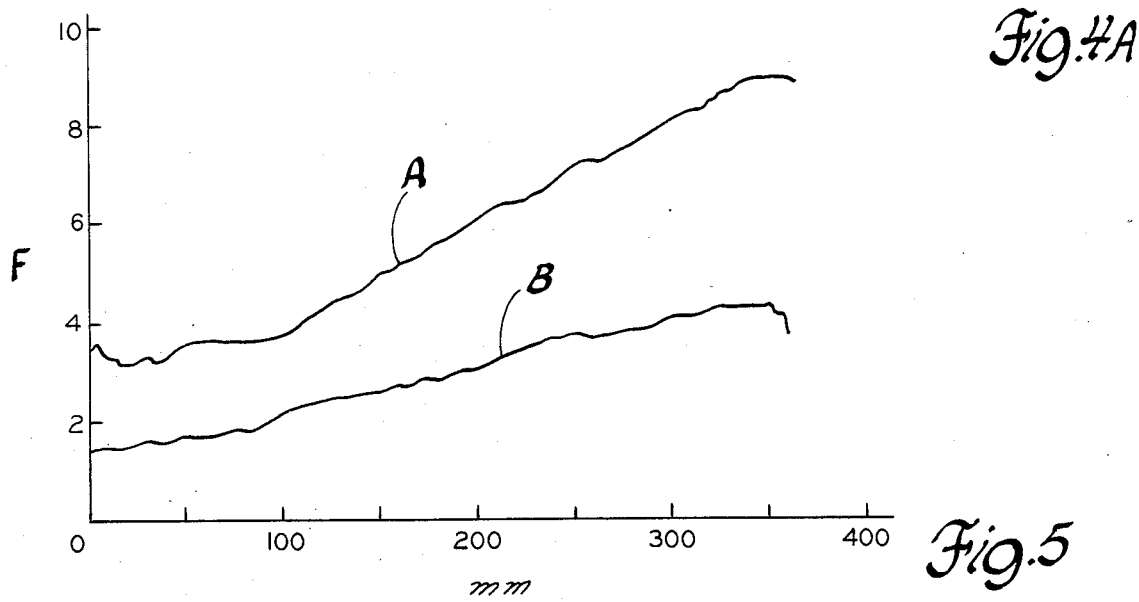
Fig.5

STRIP ROLL FORMING ENERGY ABSORBING DEVICE

This invention relates to energy absorbers and more particularly to a new and improved strip roll forming energy absorbing device which automatically adjusts to the gauge of the strip to effectively provide a zero clearance path between the strip and a roller set through which the strip is drawn in response to application of impact load.

Various energy absorbing devices have relatively movable components that utilize a deformable strip usually of a ductile metal which is drawn through a predetermined path between rollers, fixed cylinders or rigid members usually as the components are telescoped or collapsed to absorb energy of an applied load. An illustrative energy absorber device is shown in U.S. Pat. No. 2,578,903 issued Dec. 8, 1951 to W. H. Smith. The energy absorbing device of the present invention is of this general category but advantageously utilizes a roller arrangement which automatically adjusts to the thickness or gauge of the strip so that there is no clearance between the strip and the rollers to optimize working of the metal of the strip and energy absorption over predetermined travel. More particularly, the preferred embodiment of this invention utilizes two sets of multiple rollers each having two fixed location rollers and an associated floating roller which provides a zero clearance path through which an associated deformable strip is routed. During operation of this invention, the floating roller is drawn against the strip and toward the two fixed location rollers by the force applied to the strip pulling the strip through a reversely curved path provided by the associated roller set. This action forces the strip to deform and bend with the same radius as the cylinders or rollers to absorb energy and provide greater consistency and tunability of the resistive force.

A feature, object and advantage of this invention is to provide a new and improved strip roll forming energy absorbing device which provides for the selective changing of the energy absorbing force deflection properties of the device.

Another feature, object and advantage of this invention is to provide a new and improved strip roll forming energy absorbing device consisting of bending a ductile sheet metal strip in a looped path through a plurality of rollers whose axes form the apexes of a triangle. Two of these rollers can turn on fixed shafts and are spaced one above the other so that a floating third roller cannot pass between them. The strip is routed around the floating roller and both ends of the strip are passed between the two fixed shaft rollers. By applying a force exceeding a predetermined magnitude to one end of the strip the floating roller is displaced toward the other two rollers by the ductile strip. Continued force application draws the strip through the rollers first bending it in one direction and then in the opposite and back again for highly effective and efficient energy absorption.

Another feature, object and advantage of this invention is to provide a new and improved strip roll forming energy absorbing device in which the force required to pull the strip through the rollers is proportional to the width of the strip and proportional to the cube of the strip gauge. The force deflection properties of the energy absorbing device are readily varied by changing the strip width or gauge. The force can also be varied relative to deflection by tapering the strip so that the width drawn through the rollers varies with deflection.

Another feature, object and advantage of this invention is to provide a new and improved strip roll energy absorbing device in which two fixed location roll cylinders are mounted one above the other and close together a floating roll cylinder located at one side of the fixed location cylinders and in operation is drawn against an elongated ductile strip looped around the floating roller and between the two fixed location rollers by the force pulling the strip through the rollers. With this invention, there is automatic adjustment to the gauge of the strip which provides zero clearance between the strip and the rollers. As the strip is pulled through the device, it is bent with the same radius as the cylinders to absorb energy with predetermined consistency.

These and other features, objects and advantages of this invention will be more apparent from the following detailed description and drawing in which:

FIG. 3 is an axonometric view of the roll-forming energy absorbing device of this invention as utilized in the column of FIGS. 1 and 2.

FIG. 4 is a top plan view of the roll formed energy absorbing device of FIG. 3.

FIG. 4A is a cross-sectional view of a modification of a strip used in the energy absorbing device of FIG. 4 illustrating increasing gauge of the strip.

FIG. 5 is a graph illustrating operation of this device utilizing strips of various gauges.

Figure 1:
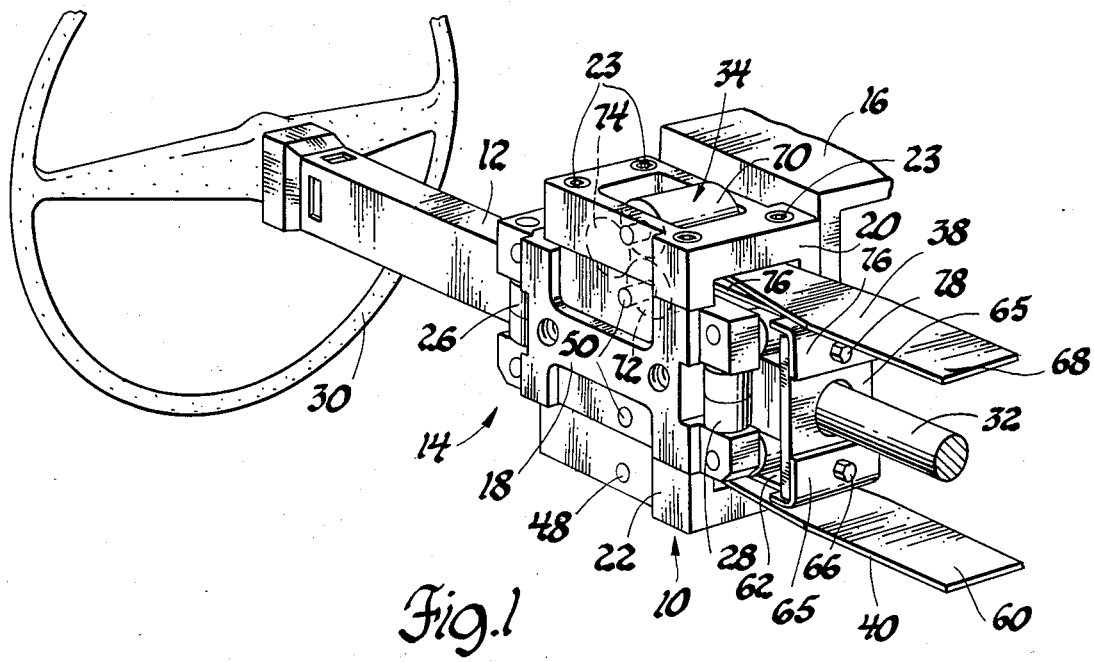
FIG. 1 is an axonometric type view of a collapsible steering column incorporating the present energy absorbing device invention before stroking and energy absorbing.
Figure 2:
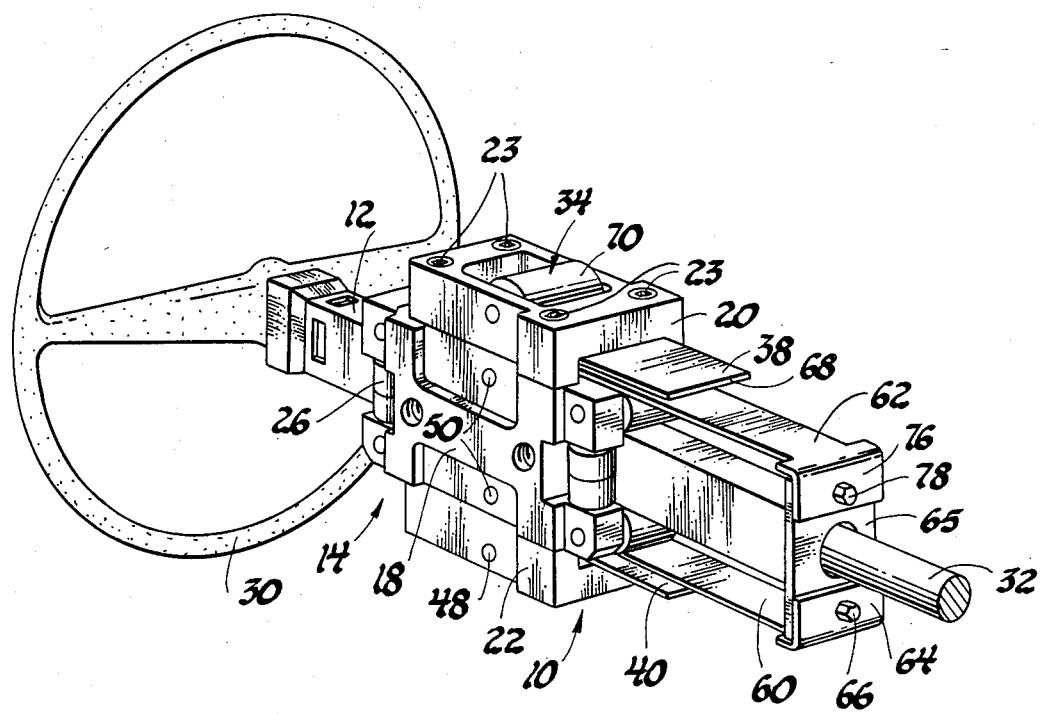
FIG. 2 is view similar to FIG. 1 illustrating this invention after stroking.

Turning now in greater detail to the drawing, there is shown in FIG. 1 a steering column assembly 10 here designed for a test sled but which may be used in a conventional vehicle application, if desired. This column incorporates an elongated rectilinear jacket 12 which is mounted for linear stroking movement in a multi-part block housing assembly 14 that is secured to a fixed support in the vehicle or test sled by cross beam 16. The housing assembly has a central body 18 with thick top and bottom plates 20, 22 secured thereto by suitable fasteners such as threaded fasteners 23. This housing assembly 14 provides a centralized passage therein which receives the mast jacket 12 for linear stroking movement therethrough and incorporates squared sets of rollers 26, 28 at opposite ends thereof which have rolling contact with the sides of the rectilinear jacket so that it can stroke smoothly without side contact on the housing in an energy absorbing mode of operation.

Operatively mounted at the upper extremity of the jacket is a steering wheel 30 that in a vehicular steering application may be connected to a conventional steering shaft 32 preferably having telescoping parts which collapse when the column is stroked in response to an impact load directed onto the steering wheel. In a test sled the steering shaft may be eliminated, if desired.

Mounted in the housing 14 are top and bottom sets 34, 36 of rollers, see FIGS. 1 and 4, which deform by bending and by further flattening elongated metallic ductile metal strips 38 and 40 during stroking movement of the mast jacket 12 relative to the housing 14. These roller sets are substantially identical and effectively provide a zero clearance path for the two ductile strips 38, 40 that are pulled through the roller sets when the mast jacket is stroked.

FIGS. 3 and 4 illustrate the bottom roller set 36 having fixed location upper and lower rollers 44 and 46 mounted for rotation in the housing axes provided by pivot shafts 48, 50. Roller 44 is mounted at a fixed distance and immediately above roller 46. A floating roller 52 is mounted in the housing assembly 14 immediately forward of the fixed shaft rollers 44, 46. The floating roller 52 has a diameter greater than spacing between the two fixed location rollers 44, 46 so that it cannot be pulled through the space therebetween by the associated ductile strip 40.

As shown the ductile metal strip 40 extends from a lower free end portion 60 forward of the housing 14 and is threaded between the two fixed location rollers 44 and 46. The strip 40 is then looped around the floating roller 52 and extended as an upper portion 62 to overlie the lower free end portion 60. The upper portion terminates in an upright end 64 that is fixed to an end plate 65 by threaded fasteners 66. The end plate 65 is welded or otherwise secured to the lower end of the mast jacket 12 and has a circular opening therein through which the steering shaft 32 extends into connection with conventional steering gear when used in a steering vehicular application. The upper metallic strip 38 with reverse orientation is substantially the same in construction and operation as described in connection with the lower strip. From an upper free end 68, the upper strip 38 feeds between the rotatable fixed axis rollers 70, 72 and in a looped path around the floating roller 74 mounted in housing assembly 14. From the floating roller 74, the strip extends under the free end to a right angled terminal end 76 where it is secured to the plate 65 by a threaded fastener 78.

In operation, a load exceeding a predetermined minimum load is applied to the steering wheel 30 to stroke the mast jacket through the housing 14. When this load is applied, the strips 38 and 40, which preferably are identical, will be bent and in many cases, are further flattened as they are pulled through the roller sets. During this action, the floating rollers will be drawn into close proximity to the fixed location rollers thereby automatically adjusting to the gauge of the strips. Accordingly, this arrangement effectively provides zero clearance between the strip and the rollers of the associated roller set. When pulled, the strip is forced to bend with the same radius as the rollers or cylinders to provide greater consistency and tunability of the resistive force. With clearance between the rollers being eliminated strips of varying gauge can be provided to tailor energy absorbing characteristics. For example, in FIG. 5, a curve A picked up through sensors mounted on the column in a sled test represents the energy absorbing characteristics of a strip with 0.076 inch thickness. The ordinate F is in newtons while the abscissa records the stroke in millimeters. Curve B represents the energy absorption of a strip with 0.060 inch thickness. The strips can also be modified by having them of tapered width such as shown in FIGS. 3 and 4 so that as the strips are pulled, there is more material being worked by the roller sets with resultant increased energy absorption. Also the strip can be made with increased or gradually increasing gauge (see FIG. 4A) so that the resistance force or energy absorption is more sharply increased as the strips are pulled therethrough.

While a preferred embodiment of the invention has been shown and described to illustrate the invention, other modifications will be apparent to those skilled in the art. Accordingly, the scope of this invention is set forth in the following claims in which an exclusive property or privilege is claimed.

The embodiments of the invention in which an exclusive property or privilege is claimed are defined as follows:

1. An energy absorber unit comprising a stationary support member and a movable member, said movable member being mounted for linear stroking movement relative to said stationary member, said stationary member having a pair of fixed location rollers of predetermined diameter and spaced a predetermined distance from one another, shaft means associated with each of said rollers operatively mounting said rollers for turning movement with respect to said stationary member, a floating roller having an axis of rotation in a plane parallel to a plane extending through said shaft means, said floating roller bearing disposed to one side of said pair of rollers having a diameter greater than the predetermined spacing between said rollers, an elongated strip of thin ductile material extending from a free end portion to a fixed end portion, securement means securing said fixed end portion of said strip to said movable member, and said strip leading from said securement means in a fixed path under one of said fixed rollers and around said floating roller and then over the other of said fixed rollers to said free end portion so that stroking of said movable member upon application of a predetermined load thereto pulls said strip and to instantaneously effect the radial displacement of said floating roller against said strip and toward a position between the fixed location rollers so that said strip is simultaneously bent with a predetermined and fixed radius and is worked to provide a predetermined resistive force to immediately retard said stroking movement and progressively absorb the energy of said load.

2. An energy absorber unit comprising a stationary support member and a movable member, said movable member being mounted for linear stroking movement relative to said stationary member in response to an inpact load being imparted to said movable member, said stationary member having a pair of fixed location rollers of predetermined diameter and spaced a predetermined distance from one another, shaft means associated with each of said rollers operatively mounting said rollers for turning movement with respect to said stationary member, a floating roller disposed to one side of said pair of rollers having a diameter greater than the predetermined spacing between said rollers, an elongated strip of thin ductile metal, securement means securing said strip adjacent one end thereof to said movable member, and said strip leading from said securement means between said fixed rollers and looping around said floating roller into lapping relationship on itself to a terminal free end so that stroking of said movable member pulls said strip through said rollers to effect the instantaneous radial displacement of said floating roller against said strip and in between the fixed location rollers simultaneously bending said strip with a predetermined and fixed radius so that said material of said strip is worked to provide a predetermined resistive force to retard said stroking movement and absorb energy of said impact load.

3. The energy absorber unit of claim 2 wherein said free end of said strip has tapered side portions to increase the width of the free end thereof to increase the energy absorption capacity of said unit.

4. The energy absorber unit of claim 2 wherein said free end of said strip has progressively increasing gauge to increase the energy absorbing capacity of said unit.

* * * * *